United States Patent
Tian et al.

(10) Patent No.: US 9,422,161 B2
(45) Date of Patent: Aug. 23, 2016

(54) ULTRAHARD NANOTWINNED BORON NITRIDE BULK MATERIALS AND SYNTHETIC METHOD THEREOF

(71) Applicant: YANSHAN UNIVERSITY, HeBei (CN)

(72) Inventors: Yongjun Tian, HeBei (CN); Dongli Yu, HeBei (CN); Bo Xu, HeBei (CN); Julong He, HeBei (CN); Zhongyuan Liu, HeBei (CN); Wentao Hu, HeBei (CN); Kun Luo, HeBei (CN); Yufei Gao, HeBei (CN); Zhisheng Zhao, HeBei (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 0 days.

(21) Appl. No.: 14/407,017
(22) PCT Filed: Aug. 2, 2013
(86) PCT No.: PCT/CN2013/080726
§ 371 (c)(1),
(2) Date: Dec. 10, 2014
(87) PCT Pub. No.: WO2014/019546
PCT Pub. Date: Feb. 6, 2014

(65) Prior Publication Data
US 2015/0158727 A1     Jun. 11, 2015

(30) Foreign Application Priority Data
Aug. 3, 2012   (CN) .......................... 2012 1 0285274

(51) Int. Cl.
*B01J 3/06* (2006.01)
*B82Y 30/00* (2011.01)
(Continued)

(52) U.S. Cl.
CPC ............ *C01B 21/0648* (2013.01); *B01J 3/062* (2013.01); *B82Y 30/00* (2013.01); *C04B 35/5831* (2013.01);
(Continued)

(58) Field of Classification Search
None
See application file for complete search history.

(56) References Cited

U.S. PATENT DOCUMENTS

| 2004/0182011 A1 | 9/2004 | Ohtsubo et al. |
| 2011/0033707 A1 | 2/2011 | Tang et al. |
| 2011/0230122 A1 | 9/2011 | Le Godec et al. |

FOREIGN PATENT DOCUMENTS

| CN | 1703383 A | 11/2005 |
| CN | 1931717 A | 3/2007 |

(Continued)

OTHER PUBLICATIONS

Rafaja et al.; Synthesis, microstructure and hardness of bulk ultrahard BN nanocomposites; J. Mater. Res., vol. 23, No. 4; Apr. 2008.*

(Continued)

*Primary Examiner* — Guinever S Gregorio
(74) *Attorney, Agent, or Firm* — Sughrue Mion, PLLC (57) ABSTRACT

The invention relates to an ultrahard nanotwinned boron nitride bulk material and synthetic method thereof. Particularly, the invention discloses a nanocrystalline cubic boron nitride bulk material containing high density of twins and synthetic method thereof, in which a nanotwinned boron nitride bulk are synthesized from nanospherical boron nitride particles (preferably with a size of 5-70 nm) with onion-like structure as raw materials by using high temperature and high pressure synthesis. As compared with the prior arts, the nanotwinned boron nitride bulk obtained according to the invention has a much higher hardness than that of a normal cubic boron nitride single crystal. The nanotwinned boron nitride bulk has great prospects in applications, such as precision and ultra-precision machining, abrasives, drawing dies, and special optics as well as other fields.

14 Claims, 9 Drawing Sheets

(51) Int. Cl.
    *C01B 21/064*     (2006.01)
    *C04B 35/645*     (2006.01)
    *C04B 35/5831*    (2006.01)

(52) U.S. Cl.
    CPC ........ *C04B 35/645* (2013.01); *B01J 2203/066* (2013.01); *B01J 2203/0645* (2013.01); *C01P 2002/60* (2013.01); *C01P 2002/72* (2013.01); *C01P 2004/02* (2013.01); *C01P 2004/04* (2013.01); *C01P 2004/64* (2013.01); *C04B 2235/52* (2013.01); *C04B 2235/5409* (2013.01); *C04B 2235/5454* (2013.01); *C04B 2235/723* (2013.01); *C04B 2235/781* (2013.01); *C04B 2235/96* (2013.01)

(56) References Cited

FOREIGN PATENT DOCUMENTS

| | | |
|---|---|---|
| CN | 1931719 A | 3/2007 |
| JP | 62-278170 A | 12/1987 |
| JP | 1-184032 A | 7/1989 |
| JP | 3-159964 A | 7/1991 |
| JP | 4-126541 A | 4/1992 |
| JP | 11-255506 A | 9/1999 |
| JP | 2001-19411 A | 1/2001 |
| JP | 2003-64350 A | 3/2003 |
| JP | 2007-502770 A | 2/2007 |
| WO | 2010/004142 A2 | 1/2010 |

OTHER PUBLICATIONS

Yongjun Tian et al., "Ultrahard nanotwinned cubic boron nitride," Nature, Jan. 17, 2013, pp. 385-388, vol. 493.
International Search Report of PCT/CN2013/080726 dated Nov. 7, 2013.
Written Opinion of the International Searching Authority of PCT/CN2013/080726 dated Nov. 7, 2013.
Japanese Office Action (Notification of Reasons for Rejection) issued by Japanese Patent Office for JP 2015-518838 dated Jul. 7, 2015.
Tang et al.; "Synthetic Routes and Formation Mechanisms of Spherical Boron Nitride Nanoparticles"; Advanced Functional Materials; 2008, 18, pp. 3653-3661; www.afm-journal.de.
Communication dated Apr. 1, 2016 from the State Intellectual Property Office of the P.R.C. issued in Application No. 201210285274.0.
Solozhenko et al., "Creation of Nanostuctures by Extreme Conditions: High-Pressure Synthesis of Ultrahard Nanocrystalline Cubic Boron Nitride", Advanced Materials, 2012, 24, pp. 1540-1544.
Communication dated Mar. 22, 2016 from the European Patent Office issued in Application No. 13825107.9.

* cited by examiner

Figure 16

# ULTRAHARD NANOTWINNED BORON NITRIDE BULK MATERIALS AND SYNTHETIC METHOD THEREOF

CROSS REFERENCE TO RELATED APPLICATIONS

This is a National Stage of International Application No. PCT/CN2013/080726 filed Aug. 2, 2013, claiming priority based on Chinese Patent Application No. 201210285274.0 filed Aug. 3, 2012, the contents of all of which are incorporated herein by reference in their entirety.

FIELD OF THE INVENTION

The present invention relates to ultrahard materials, particularly, to ultrahard nanotwinned boron nitride bulk materials and synthetic method thereof.

BACKGROUND OF THE INVENTION

Diamond and cubic boron nitride (cBN) are the dominant ultrahard materials used for industrial applications. Diamond, with exceptional physical characteristics such as hardness, wear resistance, thermal sensitivity, thermal conductivity, and semiconductivity, is the hardest natural substance and well known as the "king of hardness". Diamond has a wide range of applications, such as handicrafts and industrial cutting tools. cBN, as a novel ultrahard material emerging after synthetic diamond, can be synthesized catalytically from hexagonal boron nitride under high temperature-high pressure (HTHP). cBN has excellent performances such as high hardness, thermal stability, chemical inertness, good infrared transmittance, and large bandgap. cBN is the second hardest material after diamond, but has much higher thermal stability than that of diamond, and is chemically more stable to ferrous metals. With very excellent grinding and cutting performance, cBN abrasives are not only capable of processing difficult-to-grind materials to improve productivity, but also capable of effectively improving the cutting quality of work pieces. Utilization of cBN is a great contribution to metal processing, resulting in a revolutionary change of grinding and cutting industry. To realize a wider range of industrial applications, diamond or cBN is usually sintered into polycrystalline diamond or cBN under HTHP by using suitable binders.

However, particle sizes of diamond or cBN used in industry are generally very small. Although polycrystalline diamond or cBN can be processed into bulk materials with larger size, the strength of such polycrystals is much lowered due to the presence of hinders. To further improve the performance of ultrahard materials. Japanese researchers, Tetsuo Irifune et al., transformed graphite directly into ultrahard polycrystalline diamond under 12-25 GPa and 2300-2500° C. by employing the HTHP technique. The produced polycrystalline diamonds are light yellow transparent bulks with a size up to 7.5 mm and Knoop microindentation hardness up to 140 GPa. For commercially available polycrystalline cBN, the Vickers hardness is usually 33-45 GPa. To improve the performance of polycrystalline cBN, Japanese researchers, Takashi et al., synthesized sintered cBN bulk from amorphous BN powders as raw materials under 7.7 GPa and 2200° C. The Vickers hardness is improved to 51 GPa for this bulk. Recently, Scilozhenho et al. synthesized nanostructured cBN with Vickers hardness up to 85 GPa by using graphite like BN under 20 GPa and 1770 K.

However, these cBN materials have a variety of shortcomings, especially the relatively low hardness not satisfying the practical necessity. Moreover, the particle sizes of the currently available cBN materials are too small for direct applications. Therefore in industry, there exists a persistent demand for cBN materials with higher hardness and larger bulk size.

DESCRIPTION OF THE INVENTION

The present invention provides ultrahard nanotwinned boron nitride bulk materials and synthetic method thereof.

The present invention is based on the following amazing finding: nanotwinned boron nitride bulk materials can be synthesized from nanospherical boron nitride with onion like structures, instead of conventionally used BN powders or graphite-like BN, as raw materials under HTHP, these nanospherical particles can be transformed into cBN with a large number of twins under HTHP meanwhile inhibiting grain growth so as to produce cBN nanocrystals with high density of twins. cBN materials with ultrahigh hardness can thus be obtained due to effectively enhanced strength and hardness from the twin structures.

Synthesis of ultrahard cBN materials from nanospherical boron nitride with onion-like structures has never been reported before. Synthesis of nanotwinned boron nitride bulks has not been reported either.

Specifically, the present invention discloses a high pressure synthetic method for preparing nanotwinned boron nitride bulk materials with ultrahigh hardness, comprising:
(1) Loading nanospherical BN with onion like structure) particles as the raw material into a mold, and pressing the into a preform;
(2) Loading the preform into a high pressure synthetic mold, and synthesizing under 4-25 GPa and 1200-2300° C.; and
(3) Decompressing and cooling.

Nanospherical BN with onion-like structures, as the raw material of the present invention, is a known material developed in recent years, which is also known as onion-like BN. The properties, features, and preparation method of this material are well known to persons in the art. For example, these are described in detail in U.S. patent application Ser. No. 12/698,897 published as Not US2011/0033707A1 on Feb. 10, 2011 and "Synthetic Routes and Formation Mechanisms of Spherical Boron Nitride Nanoparticles", *Advanced Functional Materials*, 2008, 18, P3653-3661 by Tang Chengchun et al., the entirety of which are incorporated into the present application by reference.

Onion-like structure, also called onion-like nested structure, is well known in crystallography and refers to a concentric multilayered spherical structure of particles observed under transmission electron microscopy.

Figure 1:
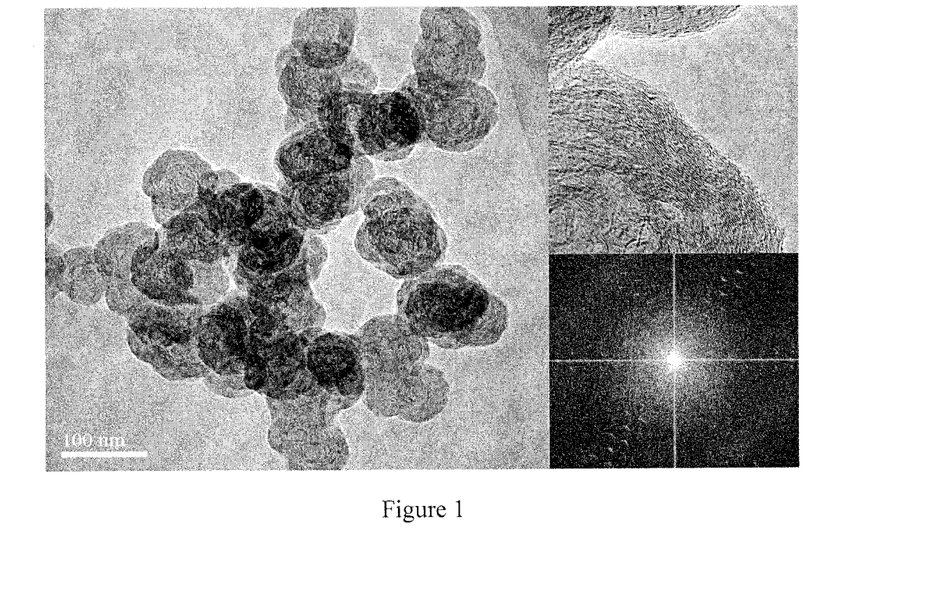
FIG. 1 shows the TEM images, layered structure and the electron diffraction pattern of nanospherical BN with an onion-like structure, as the raw material of the present invention.

Briefly, nanospherical boron nitride with onion-like structure used in the present invention is an approximately spherical-shaped nanoparticulate boron nitride material, characterized by the spherical shell for each crystal layer inside the nanoparticle. The particle size is usually in the range of 5-70 nm (preferably 10-50 nm) with a uniform distribution of particle size. An illustrative preparation method of such material is: heating a mixture of boric acid ester (preferably methyl borate) and nitrogen source (e.g. nitrogen) in an atmosphere of ammonia gas and argon gas at high temperature (usually 600-1500° C. e.g. using a CVD apparatus) to form the reaction product; crystallizing the reaction product (preferably by cooling at 0-50° C.) to form boron nitride precursors of spherical nanoparticles; heating (usually at 1200-1600° C.) the precursors in inert gas atmosphere to transform them into the final product of nanospherical BN particles. Electron microscopy images of exemplary nanospherical BN particles are shown in FIG. 1.

As raw material of the present invention, nanospherical BN particles preferably have particle sizes of 5-70 nm, more preferably 10-50 nm. Usually as reaction raw material, the purity is not less than 90%, preferably not less than 95%.

In the second step, the high pressure synthesis, of the present invention, the employed temperature range is usually 1200-2300° C., such as from 1300° C., 1400° C., 1500° C. or 1600° C. to 1800° C., 1900° C., 2000° C., 2100° C. or 2200° C., and can also be for example 1800-2300° C.; the employed pressure range is usually 4-25 GPa, such as from 5, 6, 7, 8, 9, 10, 11 or 12 GPa to 18, 19, 20, 21, 23 or 24 GPa. The reaction time is generally less critical, and may be for example, 1-1600 min, 1-240 min, 1-120 min, 2-120 min, 10-120 min, etc., which can be adjusted according to the employed temperature and pressure.

The apparatus for HTHP synthesis of nanotwinned boron nitride bulk materials is well known to those skilled in the art. The method of the present invention can be carried out on such known apparatuses, such as the T25 System, a 1000-ton in-situ HTHP synthesis and test system, from Rockland Research Corporation, US.

Figure 2:
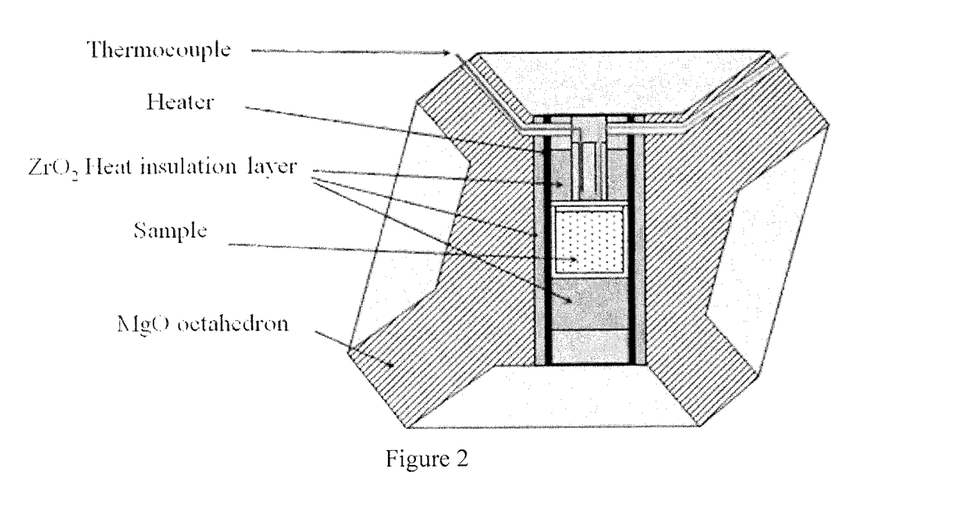
FIG. 2 shows the schematic diagram of HTHP assembly block as used in the present invention in a longitudinal sectional view.

During the HTHP synthesis, the preform of raw material is firstly inserted into an HTHP assembly, and then the HTHP assembly containing the preform is loaded into the HTHP apparatus for synthesis. A schematic diagram of one exemplary HTHP assembly is shown in FIG. 2. The protocol is using ceramic powders such as MgO to fabricate a block (octahedron in T25 system) with a central cavity, placing the sample, heating unit, and temperature measuring unit into this cavity, realizing pressure transmission, sealing, and thermal insulation required in the synthesis through compressing densification of the MgO block. The HTHP assembly used in the examples of the present invention is manufactured by Arizona State University, U.S. and purchased from TJ Pegasus company, U.S., with two specifications of HTHP blocks (105 and 83) used during the HTHP synthesis.

Under HTHP conditions of Step (2), nanospherical boron nitride with onion-like structure is converted into cubic boron nitride crystals. As described above, due to the nanospherical boron nitride with onion-like structure employed as the raw material in the present invention, the raw material with spherical crystal layers, when transformed into cubic phase, will form a large number of twins which prevent the grain growth, resulting in the formation of smaller (equivalent) grain size than that of known methods, and thereby a substantial increase of its performances.

After HTHP synthesis, nanocrystalline cBN bulk with twins can be obtained after decompressing and cooling, which is an ultrahard nanotwinned polycrystalline cubic (or composite) boron nitride bulk. It has one or more of the following characteristics/performance:

1) The volume of the nanotwinned boron nitride bulk is 1-2000 mm$^3$; such as 1-1500 mm$^3$, 5-1500 mm$^3$, 5-1000 mm$^3$, 10-1500 mm$^3$, 10-800 mm$^3$, 10-500 mm$^3$, or 10-200 mm$^3$;
2) The Vickers hardness of the nanotwinned boron nitride bulk is 60-120 GPa; such as from 6570, 75, 80, 85, or 90 GPa to 100, 105, 110 or 115 GPa;
3) The fracture toughness ($K_{IC}$) of the nanotwinned boron nitride bulk is 5-15 MPa·m$^{1/2}$; such as 6-14 MPa·m$^{1/2}$ or 8-13 MPa·m$^{1/2}$,
4) The grain size of the nanotwinned boron nitride bulk is 5-100 nm, such as from 6, 8, 10, 12, 15, 18 or 20 nm to 70, 75, 80, 85, 90 or 95 nm;
5) Twinned structures comprise 5-30% of the grain, with an average twin thickness of 1-15 min and
6) The nanotwinned born nitride bulk is a colorless (or light blue) and transparent crystal.

Accordingly, the present invention also relates to a cubic boron nitride bulk material with ultrahigh hardness (i.e. nanotwinned boron nitride bulk material), with internal nanocrystalline cubic structure possessing high-density twins, which have a grain size of 5-100 nm and Vickers hardness of 60-120 GPa.

It has been found that the structure of the ultrahard nanotwinned boron nitride bulk materials according to the present invention is a single phase of pure cubic sphalerite, or high-density phases consisting of cubic sphalerite and small amount of hexagonal wurtzite. Moreover, a large number of twins are comprised inside of the grains, with a twin spacing of 2-15 nm and twin density of 5-30%.

Compared with the prior art, the nanotwinned boron nitride bulks obtained according to the present invention have much higher hardness than those of traditional cubic boron nitride single crystals. The highest hardness is up to 120 GPa, which is comparable with the hardness of diamond. The nanotwinned boron nitride bulks have great prospects in applications, such as precision and ultra-precision machining, abrasives, drawing dies, and special optics, etc.

Besides the high hardness, the present invention also has one or more of the following prominent features and beneficial effects:

1) The process of the present invention is simple, without special treatment of reaction raw materials, and the high-pressure synthesis parameters are easy to control;
2) Bulk materials can be prepared using high temperature and ultrahigh pressure synthesis, and the density of the materials is high;
3) The ultrahard polycrystalline nanotwinned cubic or composite) boron nitride bulks have a relatively large volume in the range of 1-2000 m$^3$;
4) The fracture toughness ($K_{IC}$) of the nanotwinned boron nitride bulk materials is 5-15 MPa·m$^{1/2}$;
5) The grain size of the nanotwinned born nitride bulks is 5100 nm; and
6) The nanotwinned born nitride bulks are colorless (or light blue) and transparent crystals.

EXAMPLES

Preparation of Materials

Preparation of spherical BN (with onion-like structure) particles: they can be prepared, for example, by chemical vapor deposition (CVD) with trimethylborate (trimethoxyborane, $B(OMe)_3$) and ammonia ($NH_3$) as raw materials and subsequent heat treatment and the like to provide spherical BN (with onion like structure) nanoparticles.

The specific preparation processes for spherical BN (with onion-like structure) nanoparticles used in Examples 1-4 are as follows: at first trimethyl borate is brought into the reaction chamber by nitrogen gas, and ammonia is introduced simultaneously into the chamber, where they are mixed and allowed to react at 980° C.; the reaction products are then introduced from the reaction chamber into a dry ice trap for rapid cooling and collection by using argon gas; the collected white products are placed into an atmosphere of ammonia gas or argon gas, and subjected to heat treatment at 1600-1800° C. for several times to get spherical RN (with onion-like structure) nanoparticles, with particle size of 10-50 nm (30 nm for average), specific surface are of 50-60 $m^2/g$ and oxygen content of less than 1 wt %.

Apparatus

T25 HTHP synthesis equipment, from Rockland Research Corporation, is employed.

The HTHP assembly block as used is shown in FIG. 2.

Test Methods

X-ray diffraction (XRD): D8 ADVANCE, from Bruker, Germany, with X-ray wavelength of 0.154 nm (Cu $K_\alpha$) and scanning speed of 0.2 degree/min.

Electron microscopy measurements: JEM-2010, JEOL, Japan, with an accelerating voltage of 200 KV.

Microhardness tests: KB-5 BVZ, from KB Prüftechnik GmbH, Germany, indenter type; Vickers (Load Steps HV 001). Due to the variable hardness of materials within a certain range of pressure load, especially for ultrahard materials, the rigidity of which is relatively high, elastic strain of the indentation under a small load is relatively large, resulting in a higher measurement value of hardness: the hardness of such materials tends to be a constant value only when the load is greater than a critical value. Therefore, the hardness of the novel ultrahard materials of the present invention is determined by varying the load until the measured hardness reaches an asymptotic value independent of the applied loads. The varying load method is used for hardness measurements of all samples to achieve the real hardness value of the materials.

In order to understand the invention better, the present invention will be further described in details with the following examples, but not limited thereto.

Example 1

Preparation of Nanotwinned Boron Nitride Bulk-1

(1) Preparation of raw materials for HTHP: spherical BN (with onion-like structure) powders with particle sizes of 10-50 nm (30 nm in average) are placed into a glove box under nitrogen protection, and compressed in situ into a block with a diameter of 2.5 mm and length of 3 mm, which is then sealed in a crucible made of refractory metal Re for subsequent use.

Figure 3:
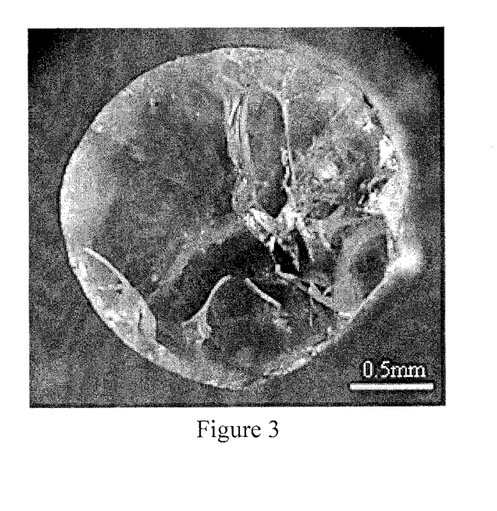
FIG. 3 shows a nanotwinned boron nitride bulk which is HTHP synthesized under 15 GPa and 1800° C.

(2) HTHP synthesis: the pre-compressed block described above is placed into a hexagonal boron nitride crucible, which is then loaded into an HTHP assembly block. The HTHP assembly block is then loaded into 125 or cubic HTHP synthesis equipment, and heated for 30 min under 15 GPa at 1800° C. A transparent nanotwinned boron nitride bulk, as shown in FIG. 3, is obtained, with a density of 3.5±0.1 $g/cm^3$.

Figure 4:
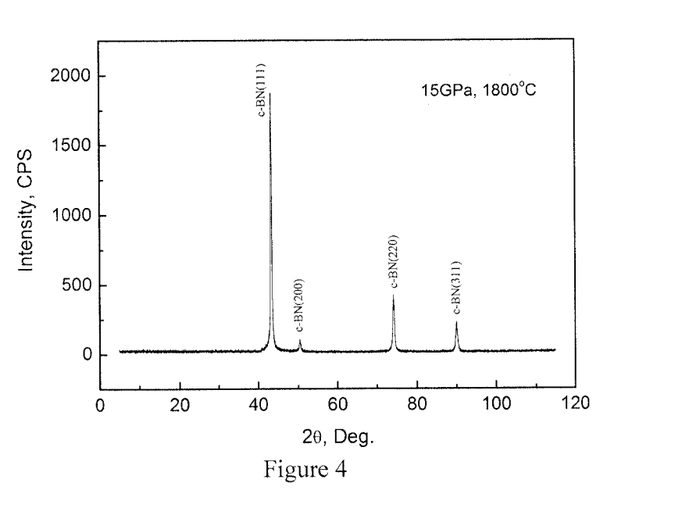
FIG. 4 shows X-ray diffraction pattern of the nanotwinned boron nitride bulk synthesized under 15 GPa and 1800° C.
Figure 5:
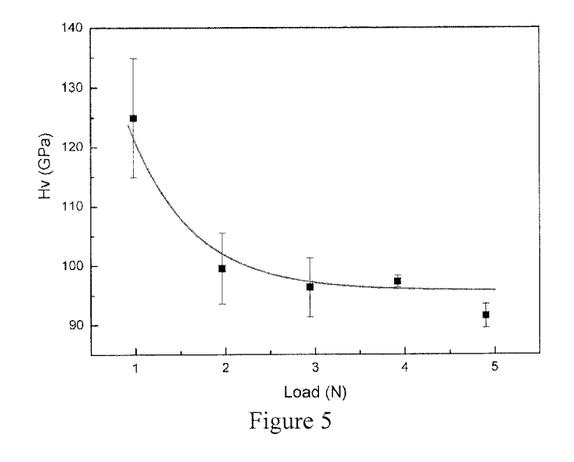
FIG. 5 shows microhardness of the nanotwinned boron nitride bulk synthesized under 15 GPa and 1800° C.

(3) Performance of the nanotwinned BN bulk: XRD pattern of the prepared nanotwinned BN bulk is shown in FIG. 4, indicating a pure cubic BN phase. The hardness measured using KB-5 BVZ microhardness tester is shown in FIG. 5, with a microhardness value of 96±8 GPa.

Example 2

Preparation of Nanotwinned Boron Nitride Hulk-2

(1) Preparation of raw materials for HTHP: spherical BN (with onion-like structure) powders with particle size of 10-50 nm (30 nm in average), are placed into a glove box under nitrogen protection, and compressed in situ into a block having a diameter of 2.5 mm and length of 3 mm, which is then sealed in a crucible made of refractory metal Re for subsequent use.

Figure 6:
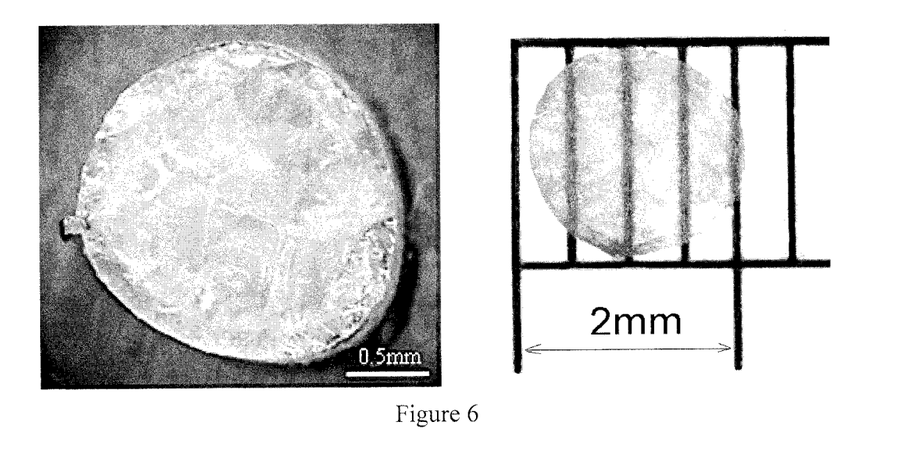
FIG. 6 shows a transparent nanotwinned boron nitride bulk synthesized under 12 GPa and 1950° C.

(2) HTHP synthesis: the pre-compressed block described above is placed into a hexagonal boron nitride crucible, which is loaded into an HTHP assembly block subsequently. The HTHP assembly block is then loaded into T25 or cubic HTHP synthesis equipment, and heated for 10 in under 12 GPa at 1950° C. A transparent nanotwinned boron nitride bulk, as shown in FIG. 6, is obtained.

Figure 7:
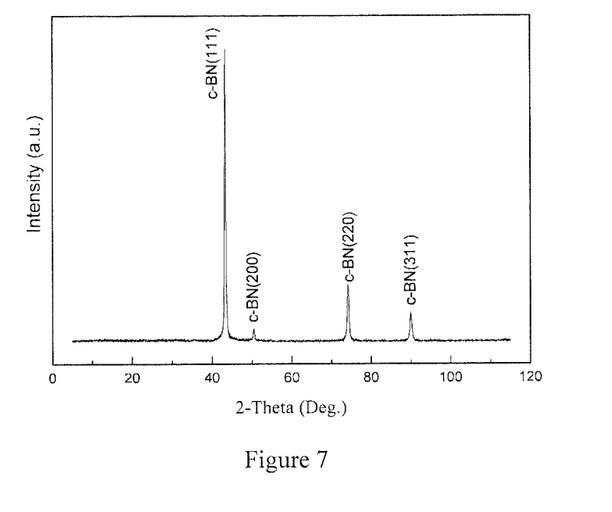
FIG. 7 shows X-ray diffraction pattern of the nanotwinned boron nitride bulk synthesized under 12 GPa and 1950° C.
Figure 8:
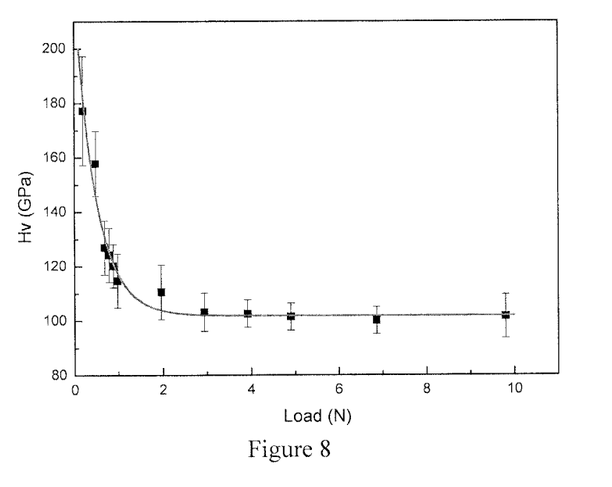
FIG. 8 shows microhardness of the nanotwinned boron nitride bulk synthesized under 12 GPa and 1950° C.
Figure 9:
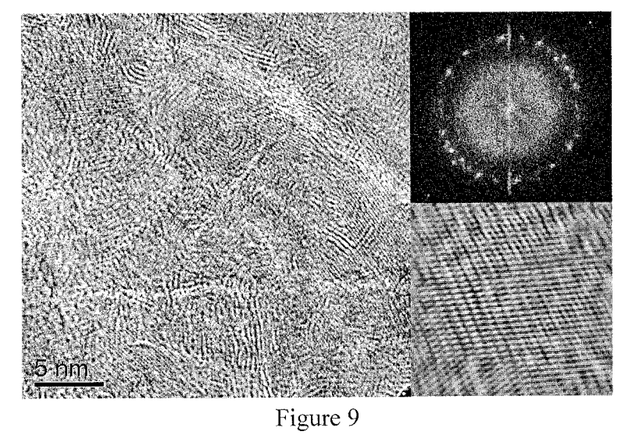
FIG. 9 shows high resolution TEM images of the nanotwinned boron nitride bulk synthesized under 12 GPa and 1950° C.
Figure 10:
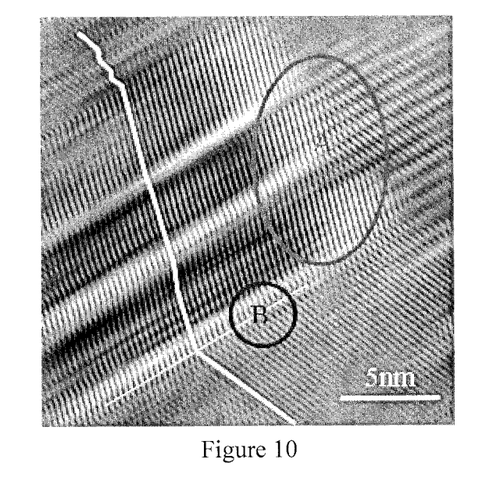
FIG. 10 shows twins in the nanotwinned boron nitride bulk synthesized under 12 GPa and 1950° C.

(3) Performance of the nanotwinned boron nitride bulk: XRD pattern of the prepared nanotwinned BN bulk is shown in FIG. 7 indicating a pure cubic BN phase. The average grain size calculated from XRD is 8 nm. The hardness measured in microhardness testing is shown in FIG. 8, with a value of 103±6 GPa. The results of high resolution TEM are shown in FIG. 9, revealing an average grain size consistent with XRD. A large number of {111} twins are clearly exhibits inside the grains, as shown in the lattice resolved TEM image of FIG. 10, wherein A emphasizes the domain boundary between cBN twins and neighboring cBN matrix, and B emphasizes the twin boundary between two adjacent cBN nanotwins. Average twin thickness is about 5 nm with a twin density of about 20-30% inside the grains based on massive observations.

Example 3

Preparation of Nanotwinned Boron Nitride Bulk-3

(1) Preparation of raw materials for HTHP: spherical BN (with onion-like structure) powders with particle size of 10-50 nm (30 nm in average), are placed into a glove box under nitrogen protection, and compressed in situ into a block having a diameter of 2.5 mm and length of 3 mm, which is then sealed in a crucible made of refractory metal Re for subsequent use.

Figure 11:
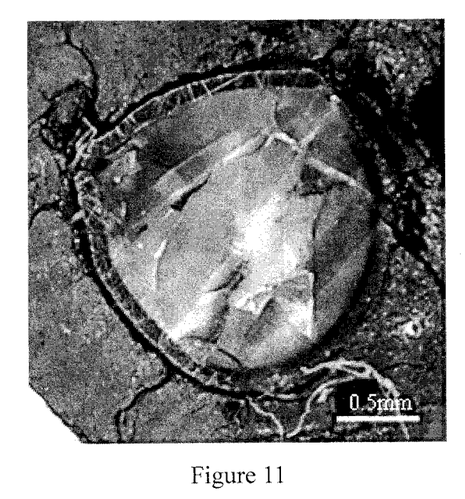
FIG. 11 shows a transparent nanotwinned boron nitride bulk synthesized under 18 GPa and 1800° C.

(2) HTHP synthesis: the pre-compressed block as described above is placed into a hexagonal boron nitride crucible and then an HTHP assembly block. Subsequently, the HTHP assembly block is loaded into T25 or cubic HTHP synthesis equipment, and heated for 2 in under 18 GPa at 1800° C. A transparent nanotwinned boron nitride bulk, as shown in FIG. 11 is obtained.

Figure 12:
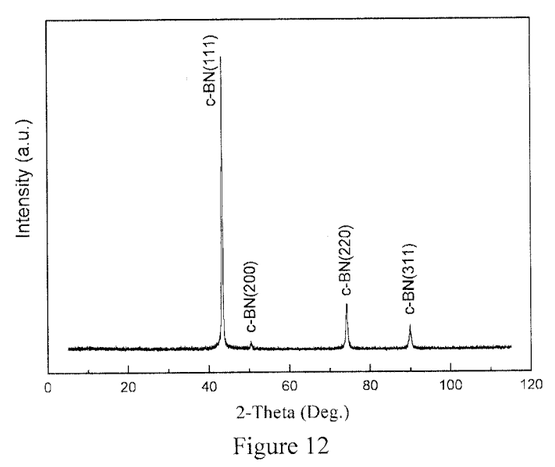
FIG. 12 shows X-ray diffraction pattern of the nanotwinned boron nitride bulk synthesized under 18 GPa and 1800° C.
Figure 13:
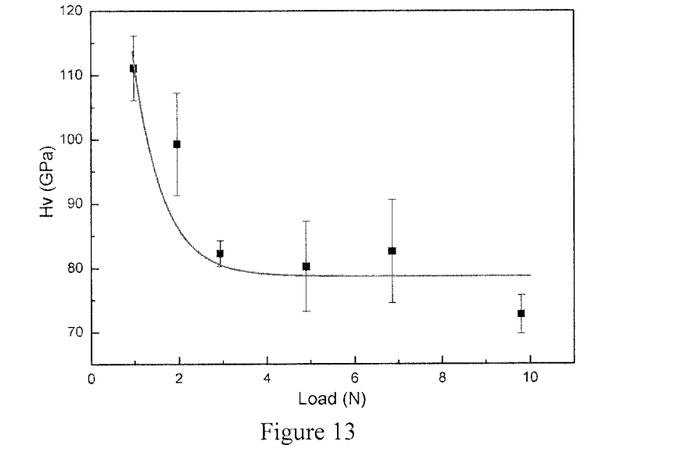
FIG. 13 shows microhardness of the nanotwinned boron nitride bulk synthesized under 18 GPa and 1800° C.

(3) Performance of the nanotwinned BN bulk: XRD pattern of the prepared nanotwinned BN bulk is shown in FIG. 12, indicating a pure cubic BN phase. The average grain size calculated from XRD is 20 nm. The hardness measured in microhardness testing is shown in FIG. 13, with a value of 80±5 GPa.

Example 4

Preparation of Nanotwinned Boron Nitride Bulk-4

(1) Preparation of raw materials for HTHP: spherical BN (with onion like structure) powders with particle size of 10-50 nm (30 nm in average), are placed into a glove box under nitrogen protection, and compressed in situ into 12 pre-compressed blocks with a diameter of 2-3 mm and a length of 3-5 mm, which are then sealed in a crucible made of refractory metal Re for subsequent use.

(2) HTHP synthesis: the pre-compressed blocks described above are placed into a hexagonal boron nitride crucible and then a HTHP assembly block. Subsequently, the H assembly block is loaded into T25 or cubic HTHP synthesis equipment, and heated for 10 in under 15 GPa at different temperatures within 1000-2300° C., respectively. Several transparent nanotwinned boron nitride bulks are obtained.

Figure 14:
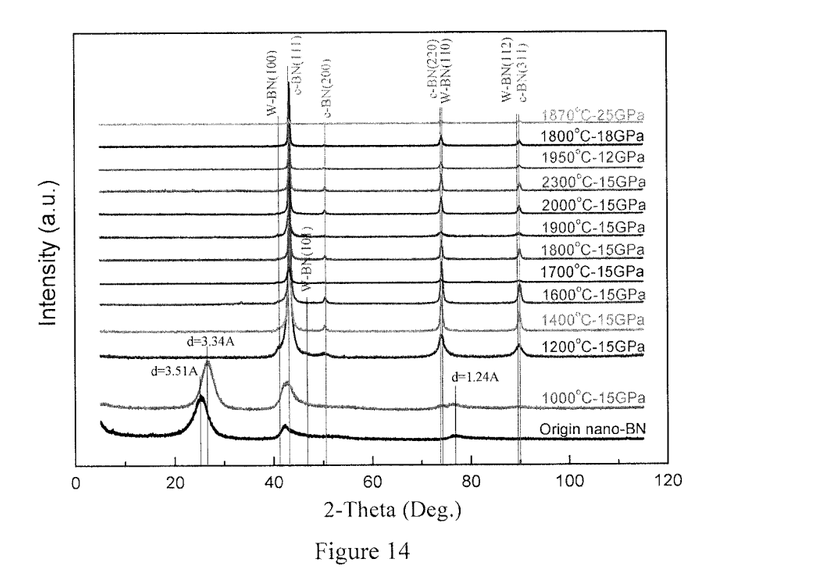
FIG. 14 shows X-ray diffraction patterns of nanotwinned boron nitride bulks synthesized under 10-26 GPa and 1000-2300° C.
Figure 15:
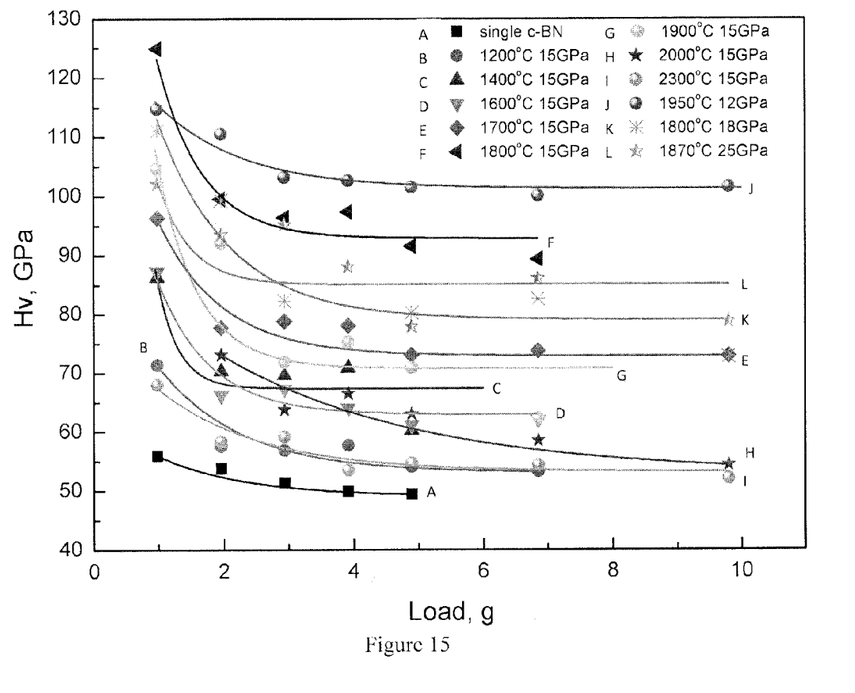
FIG. 15 shows microhardness of nanotwinned boron nitride hulks synthesized under 10-26 GPa and 1000-2300° C.
Figure 16:
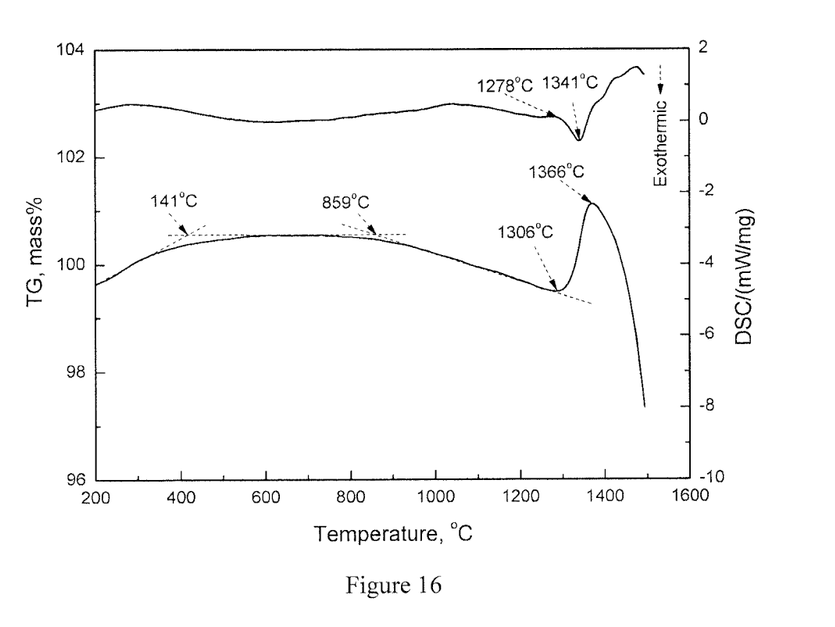
FIG. 16 shows thermal properties of a nanotwinned boron nitride bulk synthesized under 15 GPa and 1800° C.

(3) Performance of the nanotwinned BN bulks: XRD patterns of the prepared nanotwinned BN bulks are shown in FIG. 14, showing that the products synthesized above 1800° C. are pure cubic phase of nanocrystalline BN bulk, while the products synthesized below 1700° C. are BN bulks with composite phases consisting of wurtzite structure (w-BN) and cubic structure (c-BN). The average grain sizes calculated from XRD are in the range of 5-40 nm. The hardness results measured in microhardness testing are shown in FIG. 15, with values in the range of 50-110 GPa. A result of thermal analysis is shown in FIG. 16, with a starting oxidation temperature of 1278° C. The fracture toughness ($K_{IC}$) of the obtained nanotwinned boron nitride bulks is in the range of 10-13 MPa·m$^{1/2}$.

The above only illustrates preferred embodiments of the present invention, but the scope of the invention is not limited thereto. Any modification or alternative which can be readily envisaged by any skilled person in the art according to the invention should falls within the scope of the present invention. Thus, the scope of the present invention should be determined by the appended claims.

Although, candidate materials of the various components have been listed in the specification of the present invention, it should be understood that the above enumeration of component materials is neither restrictive nor exhaustive, and all of the various components can be replaced by other equivalent materials which are not mentioned in the present description, still achieving the purpose of the invention. Specific examples mentioned in the description also serve only for the purpose of explanation, instead of limiting the scope of the invention.

Furthermore, the amount ranges of each component of the invention include any combinations of any lower hunts with any upper limits, and also include arbitrary ranges constituted of particular amounts of the component mentioned in each specific example used as lower limits or upper limits. All these ranges obtained from such combinations fall within the scope of the invention, while, in order to save space, these ranges are not listed in the specification. Similarly, each feature of the present invention mentioned in the specification can be combined with any other feature. All the embodiments as obtained from such combinations fall within the scope of the invention, while, in order to save space, these embodiments are not specifically listed in the specification.

The invention claimed is:

1. Preparation method for high pressure synthesis of an ultrahard nanotwinned cubic boron nitride bulk material, which has an internal nanocrystalline cubic structure, a grain size of 5-100 nm, a Vickers hardness of 60-120 GPa, and a density of 5-30% twin structure inside the grains, wherein said hardness is determined by varying the load until the measured hardness reaches an asymptotic value independent of the applied loads, comprising the following steps:
   (1) Placing nanospherical BN particles with onion-like structure as raw materials into a mold and pressing them into a preform;
   (2) Loading the preform into a high pressure synthetic mold, and synthesizing under 4-25 GPa and 1200-2300° C.; and
   (3) Decompressing and cooling.

2. Preparation method according to claim 1, wherein the Vickers hardness of the nanotwinned boron nitride bulk material is 60-120 GPa.

3. Preparation method according to claim 2, wherein the volume of the ultrahard nanotwinned boron nitride bulk material is 1-2000 mm$^3$.

4. Preparation method according to claim 2, wherein the ultrahard nanotwinned boron nitride bulk material comprises high density of twins inside, and is a nanocrystal with zincblende structure and a grain size of 5-100 nm.

5. Preparation method according to claim 1, wherein the volume of the ultrahard nanotwinned boron nitride bulk material is 2-2000 mm$^3$.

6. Preparation method according to claim 1, wherein the ultrahard nanotwinned boron nitride bulk material comprises high density of twins inside, and is a nanocrystal with zincblende structure and a grain size of 5-100 nm.

7. Preparation method according to claim 1, wherein the particle size of the nanospherical BN particles with onion-like structure is 5-70 nm.

8. Preparation method according to claim 1, wherein the Step (2) is performed for 1-120 min.

9. Ultrahard nanotwinned cubic boron nitride bulk material, which has an internal nanocrystalline cubic structure, a grain size of 5-100 nm, a Vickers hardness of 60-120 GPa, and a density of 5-30% twin structure inside the grains, wherein said hardness is determined by varying the load until the measured hardness reaches an asymptotic value independent of the applied loads.

10. Ultrahard nanotwinned cubic boron nitride bulk material according to claim 9, wherein the volume of the boron nitride bulk material is 1-2000 mm$^3$.

11. Ultrahard nanotwinned cubic boron nitride bulk material according to claim 10, wherein the fracture toughness ($K_{IC}$) of the ultrahard nanotwinned boron nitride bulk material is 5-15 MPa·M$^{1/2}$.

12. Ultrahard nanotwinned cubic boron nitride bulk material according to claim 9, wherein the crystal structure of ultrahard nanotwinned boron nitride bulk material is a single phase cubic zincblende structure, with optionally a small amount of hexagonal wurtzite phase structure, and the twin structure inside the grains has a twin thickness of 2-15 nm.

13. Ultrahard nanotwinned cubic boron nitride bulk material according to claim 12, wherein the fracture toughness ($K_{IC}$) of the ultrahard nanotwinned boron nitride bulk material is 5-15 MPa·m$^{1/2}$.

14. Ultrahard nanotwinned cubic boron nitride bulk material according to claim 9, wherein the fracture toughness ($K_{IC}$) of the ultrahard nanotwinned boron nitride bulk material is 5-15 MPa·m$^{1/2}$.

\* \* \* \* \*